Gauthier

United States Patent [19]

[11] 4,127,635
[45] Nov. 28, 1978

[54] METHOD FOR EXTRUDING THERMOPLASTIC POLYMERS

[75] Inventor: Ray J. Gauthier, Islington, Canada

[73] Assignee: United States Gypsum Company, Chicago, Ill.

[21] Appl. No.: 461,828

[22] Filed: Apr. 18, 1974

[30] Foreign Application Priority Data

Apr. 9, 1974 [CA] Canada .................................. 197139

[51] Int. Cl.$^2$ .................................................. D02G 1/20
[52] U.S. Cl. .............................. 264/102; 264/176 R; 264/211
[58] Field of Search .................... 264/176 F, 101, 102, 264/87; 159/2 E; 260/42.57, 42.54; 425/376

[56] References Cited

U.S. PATENT DOCUMENTS

| | | | |
|---|---|---|---|
| 2,110,785 | 3/1938 | Baxter | 264/101 |
| 3,035,306 | 5/1962 | Rossiter | 264/329 |
| 3,036,335 | 5/1962 | Heston et al. | 264/102 |
| 3,082,816 | 3/1963 | Skidmore | 159/2 E |
| 3,156,009 | 11/1969 | Alsys | 159/2 E |
| 3,163,888 | 1/1965 | Shattuck | 264/329 |
| 3,207,205 | 9/1965 | Briskin et al. | 264/101 |
| 3,290,268 | 12/1966 | Scofield | 260/42.57 |
| 3,344,218 | 9/1967 | Chapra et al. | 264/176 F |
| 3,345,445 | 10/1967 | Siclari et al. | 264/176 F |
| 3,373,502 | 3/1968 | Hendry | 425/DIG. 39 |
| 3,391,232 | 7/1968 | Jackson | 264/176 F |
| 3,451,462 | 6/1969 | Szabo et al. | 264/87 |
| 3,496,133 | 2/1970 | Hoffman | 260/40 |
| 3,579,728 | 5/1971 | Reid et al. | 264/102 |
| 3,642,752 | 2/1972 | Sutter | 264/102 |
| 3,646,187 | 2/1972 | Milam et al. | 264/329 |
| 3,742,093 | 6/1971 | Skidmore | 264/349 |
| 3,799,234 | 3/1974 | Skidmore | 159/2 E |
| 3,848,041 | 11/1974 | Adomaitis | 264/102 |
| 3,917,507 | 11/1975 | Skidmore | 264/102 |
| 3,920,604 | 11/1975 | Berg et al. | 260/42.54 |
| 3,969,314 | 7/1976 | Grigull | 260/42 |
| 3,972,849 | 8/1976 | Bruenemann et al. | 264/349 |

FOREIGN PATENT DOCUMENTS

| | | | |
|---|---|---|---|
| 37-5,261 | 6/1962 | Japan | 425/207 |
| 43-5,193 | 2/1968 | Japan | 264/176 F |
| 43-30,012 | 12/1968 | Japan | 264/176 F |

Primary Examiner—Jay H. Woo
Attorney, Agent, or Firm—Kenneth E. Roberts; Robert H. Robinson; Samuel Kurlandsky

[57] ABSTRACT

Profiles may be extruded directly from powdered ABS or other similar thermoplastic materials without pelletizing the feed material, by compounding under dry air flush conditions; maintaining dry air atmosphere conditions on the compounded materials until charged into the extruder; and providing vacuum venting in the decompression zone of the extruder, with optional condensation inducement and entrapment in the vent. Method and apparatus are disclosed.

10 Claims, 6 Drawing Figures

METHOD FOR EXTRUDING THERMOPLASTIC POLYMERS

BACKGROUND OF THE INVENTION

This invention relates to extrusion of profiled products in final form from powdered thermoplastic materials; and more particularly to directly extruding final products from powdered, or pulverulent, thermoplastic materials which have heretofore generally required an intermediate stage of plasticating compaction and granulation or pelletization before extrusion into final product configurations of good quality, such materials being particularly illustrated with acrylonitrile-butadiene-styrene (ABS) terpolymer compound.

Extrusion of products such as pipe directly from powdered plastic and even pelletized plastic often results in pores or voids in the product. This is particularly troublesome in a product such as extruded pipe, where the integrity of the wall is of paramount importance. This is believed to be caused by entrapped moisture or water, unpolymerized monomers, volatile oligomers, solvents and other rapidly volatilized constituents in the compound and blended plastic materials fed to the extruder. It has therefore generally been necessary in the operation of the conventional screw-type extruder, for the feed material to be present in a granule, chip, pellet, crumb or like form generally obtained by a first extrusion of a pre-plasticating type, or by other means such as roll milling, high intensity mixing and centrifuging and the like to partially cut down on the above-described defects, such as is set out in U.S. Pat. No. 2,746,086. As recited in that patent, pellets have many advantages over the pulverulent form in being more dense and therefore taking up less space; flowing more easily; less tendency to pick up foreign material or moisture and become contaminated; and in general by actual feed test will feed much faster by weight into a product extruder than pulverulent material would in otherwise equal conditions.

Thus for the manufacture of such thermoplastic materials, one must generally, to have a more marketable and processable product, pass it through a first extrusion into sheets or rods which are then chopped up or milled into pellets and the like forms, then sold to the formulator of finished products.

In most extruders, whether of the pre-plasticating type of intermediate pellet formulation for highly hygroscopic thermoplastics or of the final product configuration type, it has still been found that considerable devolatilizing must take place. Thus improvement in results has been achieved with extruders having vents or vacuum boxes along the length of the barrel to permit escape of or to draw out in gaseous form trapped moisture, unpolymerized monomer of a volatile nature, and the like readily volatilizable constituents. These constituents, including water and low boiling solvents, tend to cause porosity, bubbles, blisters, and similar defects in the extruded product and are particularly onerous in the finally extruded product. Thus it is customary to provide a decompression zone in the extruder screw; and at that location in the extruder barrel to provide a vent either to the atmosphere or to suction means for the partial elimination of such easily volatilized constituents. Various improvements on such devices have been suggested, for example that shown in U.S. Pat. No. 2,736,058 which provides a vertically adjustable baffle to be placed within the venting means so as to aid in preventing the flow of thermoplastic material through the vent along with the volatilized constituents. Another such improvement is that shown in U.S. Pat. No. 3,212,133 wherein means are provided for a vent duct unblocking mechanism for a screw extruder that is said to return escaping plasticized material to the extruder cylinder.

That patent further discloses the suggestion that it might be desirable to locate the vent duct under rather than above the barrel, when plasticized material that is particularly moisture retentive is employed, so that the condensation products which form after the vapors are cooled can be exhausted from the vent duct. Such a suggestion on first reading appears feasible but on reflection is considered, without elaborate preventive means, to be highly susceptible to having the plasticized extrudate flow into the venting area and plug the vent along with other disastrous results flowing therefrom.

Another approach in the intermediate extruding of thermoplastic materials for formulation into granular form is that indicated in U.S. Pat. No. 3,036,335 wherein vacuum venting of the barrel is extended back to and through the feed hopper/and supply drum, along with heating of these areas so as to partially degas the material entering the extruder. An insufficiency with this disclosed method is that it was not carried back far enough, particularly in the case of especially moisture-sensitive and sticky feed materials such as the ABS copolymers and the like. Also such systems have been plagued with vacuum and material leaks. Further it is virtually impossible to effectively pull sufficient gases back through the length of highly compressed viscous melt in the barrel.

Accordingly, it is one object and advantage of the present invention to provide a method and apparatus for the extrusion of powdered or pulverulent ABS directly into final product configuration, without the necessity of an intermediate stage as generally required for forming pellets of the ABS before configuration extrusion.

Another object and advantage is the provision of a method and apparatus for the extrusion of any powdered or pulverulent thermoplastic material, particularly of a sticky, hygroscopic nature and containing substantial quantities of moisture or water, unpolymerized monomers, volatile oligomers, solvents and other readily volatilized constituents, directly into extruded final product configurations without the intermediate stage generally required of forming pellets and the like thereof.

Still another object and advantage is the provision of a method and apparatus for improved devolatilizing of any thermoplastic suitable for melt extrusion by vacuum-equipped extruders into final product configurations.

Still another object is the provision of a method and apparatus for the extrusion of thermoplastic materials into extruded profiles, which method and apparatus eliminate heretofore generally required heat history steps which may have an adverse effect on hygroscopic heat degradational thermoplastic materials.

Still another object and advantage is the provision of means to induce condensation of volatiles removed from the extruder barrel and prevent them from finding their way back into the extrudate or into the atmosphere or the waste water system.

Other objects and advantages will become apparent through the ensuing disclosure.

SUMMARY OF THE INVENTION

The present invention relates to an extruding system which represents an improvement over prior apparatus and methods by permitting more complete removal of volatiles releasible during the extruding operation; and more particularly relates to a system for directly extruding articles in final product form directly from powdered thermoplastic polymer materials such as pulverulent ABS and the like, without the necessity of intermediate pelletizing of the polymer or other drying and devolitizing of hygroscopic thermoplastic polymer.

In particular, the objects and advantages of the present invention are achieved by the process of providing heated dry or dehydrating air or inert gas flush (or moving stream or flow) over the polymer material during the compounding operations and maintaining that dehydrating gaseous atmosphere (or blanket) over the polymer material through the material's entry into the extruder; and extruding the material into shaped articles through a vacuum extruder equipped with a vacuum vent. The vent optionally is provided with an extension thereon to induce condensation of monomers and other volatiles removed from the melt. Optionally the vent extension is provided with a dam or an angle bend to resist flow of condensed volatiles back into the extruder. A cooling means such as cooled or jacketed probe, pencil, or cooling coil may optionally be utilized in connection with an optional condensate trap to further induce condensation in the extended portion of the vent and avoid contamination of the melt, the atmosphere and the waste water system by the condensate.

DETAILED DESCRIPTION

The term "powder", as used herein, denotes finely divided solid material having diameters from about 2 to about 3,000 microns. The invention will be described as partially applied to the densification and compaction of thermoplastic material, particularly ABS, having particle diameters distributed throughout the range of from about 5 to about 500 microns. Any pulverulent thermoplastic material may be used in the process; however, the process is more efficacious for the treatment of hygroscopic materials or materials containing condensable volatilizable constituents such as residual moisture, unpolymerized monomers and volatile oligomers. Thus the process is particularly appropriate for the styrenes in general, including high impact styrene, polystyrene, and styrene copolymers. Other materials efficaciously treated include polyvinyl chlorides, polyethylenes, polypropylenes, nylons, polybutenes and polycarbonates, especially when these materials are in pulverulent form. Also, additional plastics which are thermosetting but pass through a thermoplastic stage and which are suitable for extrusion or injection molding, such as phenolics or polyesters, are meant to be included in the term "thermoplastics" for use herein.

While in the ensuing description reference will be made to dry "air" flush, flow or blanket, it will be readily apparent that any inert gas such as nitrogen and the like may be employed. Further, while dry air is preferred as the dehydrating gas, this is highly variable and air of relatively low moisture content over a widely variable range may be used with variable degrees of success. All that is required is that the air be of sufficiently low moisture content as to provide a dehydrating and devolatilizing effect on the pulverulent powder being treated. Further, while the maintenance of a dry air "flush" or blanket condition is preferred, all that is required is that a dehydrating and devolatilizing gaseous stream or atmosphere be maintained over the polymer material from initial compounding of the polymer with additives through its entry into the extruder.

Figure 2:
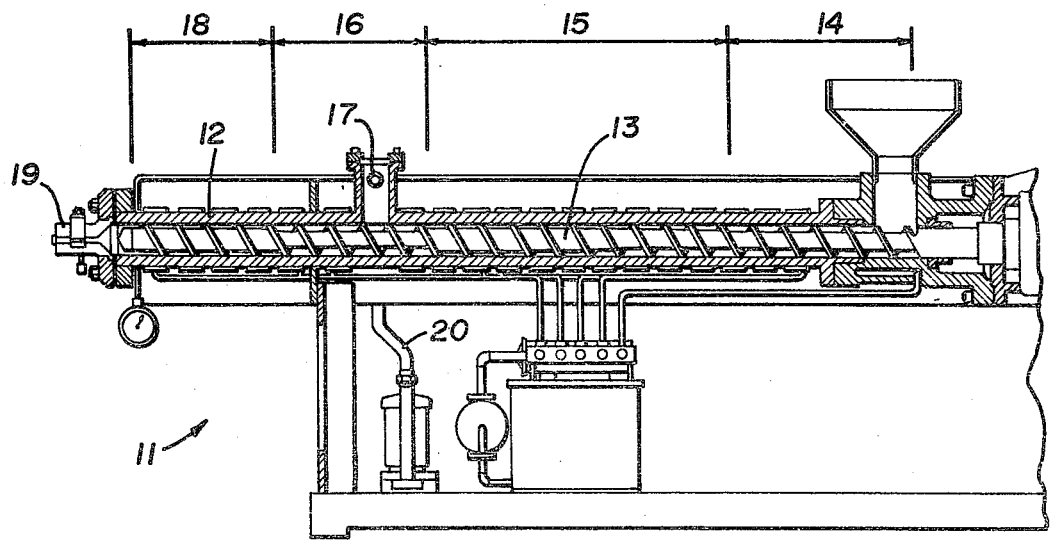
FIG. 2 is a side elevational view, partly in cross-section, and partly broken away, of a conventional vacuum vented extruder of the prior art.

As more particularly shown in FIG. 2, the extruding apparatus in general comprises an extruder 11 having an extruder barrel or cylinder with heating and cooling means 12 and an extruder feed screw or worm 13 located therein. The feed screw 13 is guided by coaxial displacement in the cylinder, and both the feed screw and the cylinder are optionally enclosed by a shroud or housing. The free driven end of the feed screw 13 is connected to drive means not shown. The screw will generally be equipped with a plurality of varying helical flights or arrangements to provide progressive stages as the material moves through the barrel, generally (reading from right to left in FIG. 2) through a first stage feed zone 14 to which the materials are fed, metered and then delivered to the compression zone. The second zone of the first stage is generally a compression zone 15 where the heat and friction of the working of the screw and/or barrel heaters process the feed material into a melt. Additional zones may be added. This is followed by decompression zone or devolatilizing zone 16 generally provided with a vent 17. The decompression zone 16 may be characterized as going from the high compression area to the decompression area, wherein there is a rapid and distinct drop in compression allowing large amounts of moisture and easily volatilizable materials to be volatilized and removed through the vent. The vent is generally located directly on top of the barrel (in a 12 o'clock position as shown in FIG. 2) and may be provided with vacuum means 20 to assist in drawing off moisture and volatiles. The third stage 16 is then followed by fourth or fifth metering zones 18 of parallel flights generally without compression, except die back-pressure, to move the material to the extruder head 19 where it passes through a die orifice (shown optionally equipped with a mandrel for extruding hollow configurations) and exits the apparatus. It should be borne in mind that the extruder screw may comprise various suitable arrangements of known screw sections in conjunction with decompression and devolatilizing section 16 of this invention, and consists of more or less than the four zones illustrated above.

Figure 1:
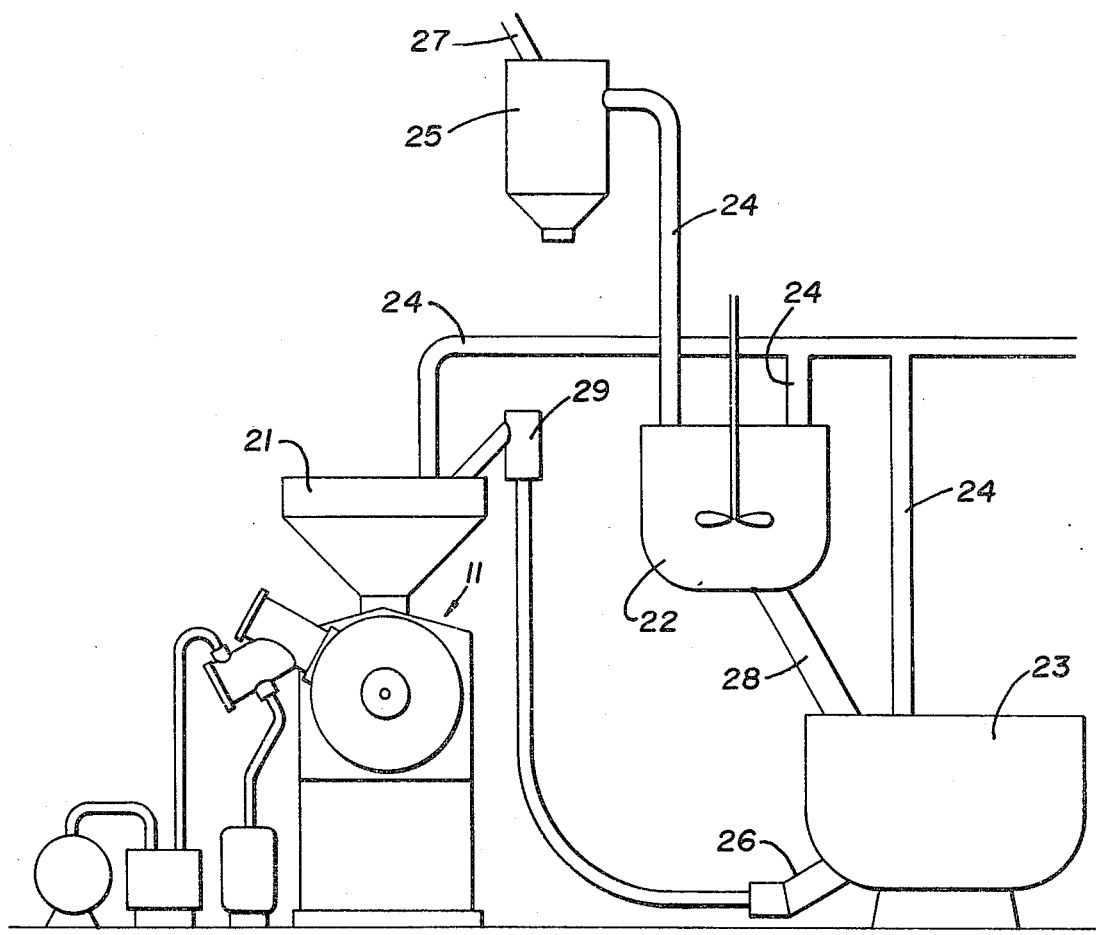
FIG. 1 is a side elevational view, partly in cross-section, illustrating the extruding system of the present invention.
Figure 3:
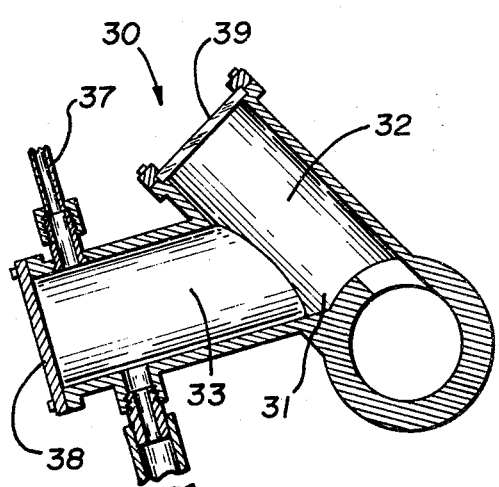
FIG. 3 is a partial sectional view of an enlargement of a portion of FIG. 1 illustrating the vent.

A preferred embodiment of the present invention is illustrated in FIGS. 1 and 3 wherein there is shown an extruding apparatus 11 but, as more particularly shown in FIG. 1, being fed by materials undergoing additional processing steps. More particularly before being fed to the hopper 21, the plastic particles, such as pulverulent or powdered acrylonitrile-butadiene-styrene polymer (ABS) compound are first fed to a mixing vessel 22 equipped for high intensity shear mixing such as the well known Henschel or Welex mixers, where the customary additional ingredients of the formulation, such as pigments, fillers, plasticizers and the like are metered in. The heat in the mixing vessel 22 is as high as possible without fusion of the materials into a plastic mass or melt in order to drive off as much moisture and volatiles as possible. With the use of ABS material it is preferred to gradually raise the temperature of the blend of ingredients until a temperature of about on the order of 230°–270° F. is reached in a short period of time; then the mixed and blended ingredients are immediately passed to the cooling vessel 23, wherein the materials are cooled to about 100°–150° F. The temperature of the cooling vessel is not very critical except to maintain the materials just below a temperature at which they would tend to stick together or begin fusion of the discrete particles. The mixing vessel 22 and the cooling vessel 23 are each sealed by means of a cover plate, and the mixing vessel and the cooling vessel are each provided with an interconnecting passageway 24 above the material levels in these vessels. The passageway 24 is connected at one end to a source of heated dry air (not shown); and at the other end to cyclone 25 venting to the atmosphere. By this means the polymer at all stages following initial formulation is maintained under dehyrating dry air atmosphere or stream; and in the mixing vessel 22 and cooling vessel 23 are thereby partially devolatilized and some moisture is removed. The hopper 21, preferable of a crammer feeder for the extruder apparatus, is also provided with a sealed cover and heated dry air atmosphere to prevent the hygroscopic polymer material from again picking up moisture prior to entering the extruding apparatus. The hopper preferably is fed by a screw conveyor 26 so as to maintain a closed system and avoid contacting the atmosphere during feeding the material from the mixing vessel by line 28 to the cooling vessel and the hopper 21.

Figure 5:
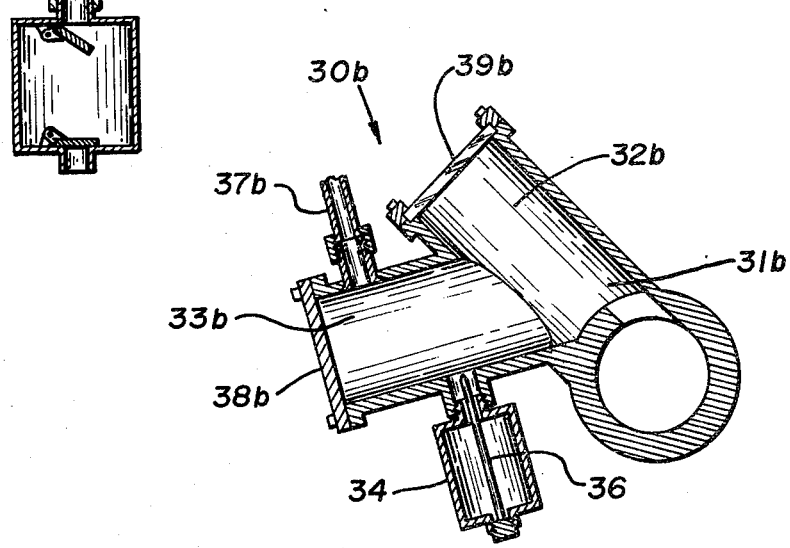
Figure 6:
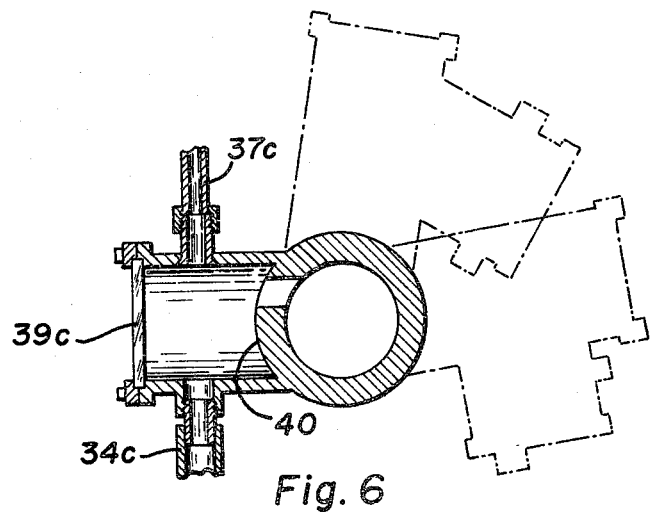

Previous attempts to feed and produce a product in final configuration from powdery materials containing high proportions of moisture and unpolymerized monomers such as ABS polymer in the conventional vented extruder, as shown in FIG. 2, resulted in a complete or partial blocking of vent opening of the extruder and highly porous extrudate. When the screw speed, barrel temperature and power feed rates were adjusted to finally enable extrusion of a product, extrusion rate was too slow for a commercial operation and secondly and more importantly, the product extruded was not acceptable. Firstly the extrudate was characterized in uneven surfaces due to surging in the extruder and badly deficient in pin-hole defects due to porosity or failure to remove all volatiles and ending up in weak spots, pinholes and other defects in the product. Thirdly, the die extruded a "wet" material wherein a non-viscous phase was discontinuously being deposited on the plastic phase resulting in wet spots appearing on the extruded product and a gathering of wet material on the die lip. These problems were overcome by the system shown in FIGS. 1 and 3–6 utilizing dehydrating dry air flush or atmosphere as described hereinabove and optional devolatilizing section vent for condensation and entrapment of volatiles. Referring specifically to FIG. 3, the vent 30 as there shown is preferably relocated to come off the extruder barrel at an about 45° angle. The vent is extended as an elongated hollow member 31 extending from the conventional passageway of the vent. The hollow member has an upstream portion 32 thereof at an angle thereto communicating via line 37 to a vacuum source (not shown). It is desirable to pull a vacuum of about 20–29 inches of mercury. Of course the higher the vacuum being pulled on the vent, the more efficiency will be generated in the elimination of volatiles and unpolymerized monomers, etc. from the decompression zone of the extruder. The downstream side portion 33 of the elongated hollow member will pass through an angle, varying generally from about 2° to about 75°, from a line passing through the passageway 31. The angle that downstream portion 33 varies from upstream portion 32 may vary widely to satisfy its function of preventing condensed volatiles from flowing back into the barrel of the extruder. Generally, the vent and its extensions will be disposed at some angle from the horizontal line of the barrel to avoid pulling melt from the barrel into the vent along with the volatiles. As shown in FIG. 6 in solid lines the angle may be replaced with a dam 40 or it may be as acute as shown in the two dotted line phantom configurations of FIG. 6.

Figure 4:
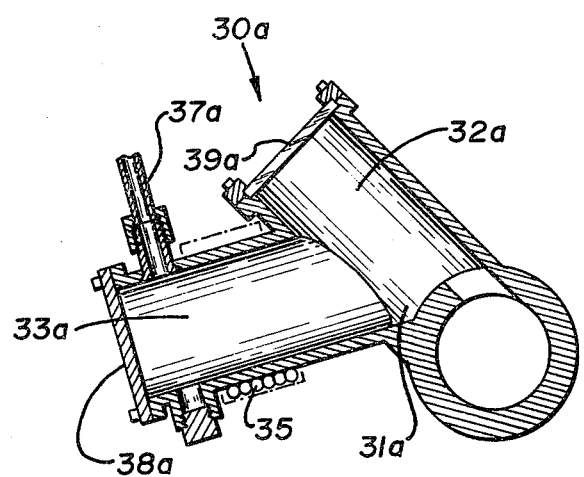
FIGS. 4, 5, and 6 are side elevational views, partially in cross-section, of alternative embodiments of the vent of the present invention.

The downstream side of the hollow member is then provided with condensation entrapment means 34. This can be nothing more than the provision of a downward extension with a releasible plug for periodic clean-out of the passageway, as shown in FIGS. 3 and 4, and preferably equipped with valves for periodic emptying by gravity without loss of vacuum as illustrated in FIG. 3. In conjunction with the vent, the condensation trap 34 functions to induce condensation of the monomers and other volatiles removed from the melt in the barrel, gather the condensed volatiles, and allow for their removal from the system. Merely spacing the condensation trap away from the barrel will provide sufficient temperature gradation to induce some condensation. However, it is more particularly preferred, as shown in FIG. 4 and 5, that either a cooling jacket or coil 35 or a cooling probe or pencil 36 be utilized to induce condensation in the inclined lower portion of the vent chamber. By the subsequent quick chill provided by the added cooling means, there is in effect a more thorough and rapid condensation of the condensables which greatly assists in pulling volatiles from the barrel and gathering them into the entrapment means. As additional advantage of an angle to the downstream portion and to supplemental cooling means and their increased efficiency in inducing condensation is to prevent backflow of the corrosive or hazardous material being condensed from reaching the vacuum pump and its waste water or polluting the atmosphere.

Thus, there is provided by the present invention a process which provides for the production of shaped articles of thermoplastic material by melt extrusion directly from pulverulent thermoplastic polymers, particularly of a sticky, hygroscopic mature and containing substantial quantities of moisture or water, unpolymerized monomers, volatile oligomers, solvents and other readily volatilized constituents without the intermediate stage generally required of granulating the polymer. In operation, the polymer is flushed with a flowing dehydrating gas during compounding of the polymer with additives, and the dehydrating gaseous atmosphere over the compounded polymer material is maintained from compounding through the materials being charged into the extruder so as to provide a dehydrating and devolatilizing effect on the pulverulent polymer being treated. Preferably the compounded polymer is heated before extrusion to a temperature below the fusion temperature of the compounded polymer materials; and then extruded into shaped articles through a screw extruder equipped with a vacuum vent. Preferably the vent is provided with an extension thereof to induce condensation more efficiently; and optionally the vent extension is provided with a dam or an angle bend to resist the flow of condensed volatiles back into the extruder. Optionally various cooling means such as a cooling coil or a jacketed probe may be utilized in connection with a further optional condensate trap to provide efficient elimination of condensed volatiles from the system without contamination of the extruding melt, the atmosphere or the waste water system.

While the present invention has been described and exemplified with respect to certain specific embodiments for purposes of illustration, it is not to be considered limited thereto; and it is understood that modifications and variations thereof, obvious to those skilled in the art, may be made without departing from the spirit or scope thereof.

What is claimed is:

1. A process for the production of shaped articles of thermoplastic materials by melt extrusion directly from the polymer feed material in pulverulent form without intermediate granulation of the feed material, by the steps of:
    (a) Flowing a dehydrating gas over the polymer material during compounding of the polymer with additives;
    (b) maintaining a dehydrating gaseous atmosphere over the polymer material from compounding through its entry into the extruder; and
    (c) extruding the polymer into shaped articles through a screw extruder having a compression zone, followed by a decompression zone and equipped with a vacuum vent in the decompression zone, and
        (1) in the decompression zone, providing vacuum venting thereof; and
        (2) inducing condensation of volatile constituents in the downstream portion of the vent.

2. The process of claim 1 wherein the polymer material, from initial compounding through entry into the extruder, is treated with a dry air flush to maintain the polymer material in a dry atmosphere.

3. The process of claim 1 wherein the polymer material, from initial compounding through entry into the extruder, is treated with a dry inert gas flush to maintain the polymer material in a dry inert gas atmosphere.

4. The process of claim 1 including the additional step of heating the compounded polymer before extrusion to a temperature below the fusion temperature of the materials.

5. The process of claim 1 including cooling the vent.

6. The process of claim 1 including the steps of trapping the condensed volatiles and separating them from the vent.

7. The process of claim 1 including the additional steps of heating the compounded polymer before extrusion to a temperature below the fusion temperature of the materials by high intensity shearing action and cooling the compounded polymer before its entry into the extruder.

8. A process for extruding acrylonitrile-butadiene-styrene thermoplastic materials in final product configuration directly from a polymer material in pulverulent form containing significant volatile constituents, which comprises the steps of:
    (a) Flowing a dehydrating gas over the polymer material during compounding of the polymer with additives;
    (b) maintaining heated dehydrating gaseous atmosphere over the polymer material from compounding through the polymer's entry into the extruder; and
    (c) extruding the polymer material into shaped articles through a screw extruder having a compression zone, followed by a decompression zone and equipped with a vacuum vent in the decompression zone, and
        (1) in the decompression zone, providing vacuum venting thereof; and
        (2) condensing volatile constituents in the downstream portion of the vent.

9. The process of claim 8 including the step of cooling the vent extension to assist in inducing condensation of volatiles.

10. The process of claim 8 including the step of trapping and separating the condensed volatiles.

* * * * *